US012505941B2

(12) United States Patent
Nakazawa

(10) Patent No.: US 12,505,941 B2
(45) Date of Patent: Dec. 23, 2025

(54) DUST CORE AND MAGNETIC COMPONENT

(71) Applicant: TDK Corporation, Tokyo (JP)

(72) Inventor: Ryoma Nakazawa, Tokyo (JP)

(73) Assignee: TDK CORPORATION, Tokyo (JP)

( * ) Notice: Subject to any disclaimer, the term of this patent is extended or adjusted under 35 U.S.C. 154(b) by 35 days.

(21) Appl. No.: 18/128,273

(22) Filed: Mar. 30, 2023

(65) Prior Publication Data

US 2023/0317334 A1 Oct. 5, 2023

(30) Foreign Application Priority Data

Mar. 31, 2022 (JP) ................................ 2022-059097
Mar. 8, 2023 (JP) ................................ 2023-036001

(51) Int. Cl.

*H01F 1/24* (2006.01)
*B22F 1/142* (2022.01)
*B22F 1/145* (2022.01)
*B22F 1/16* (2022.01)
*B22F 3/16* (2006.01)
*B22F 9/08* (2006.01)
*H01F 27/255* (2006.01)

(52) U.S. Cl.

CPC ................ *H01F 1/24* (2013.01); *B22F 1/142* (2022.01); *B22F 1/145* (2022.01); *B22F 1/16* (2022.01); *B22F 3/16* (2013.01); *B22F 9/082* (2013.01); *H01F 27/255* (2013.01); *B22F 2301/35* (2013.01); *B22F 2302/256* (2013.01); *B22F 2304/10* (2013.01); *B22F 2998/10* (2013.01); *B22F 2999/00* (2013.01)

(58) Field of Classification Search

CPC ........................................................ H01F 1/24
See application file for complete search history.

(56) References Cited

U.S. PATENT DOCUMENTS 5,651,841 A * 7/1997 Moro ........................ H01F 1/26 148/309
5,800,636 A * 9/1998 Tsukada ............. H01F 41/0246 148/306
8,916,268 B2 * 12/2014 Kawano .................. B22F 1/102 428/404
2005/0257854 A1 * 11/2005 Maeda ...................... H01F 1/24 148/105
2010/0255188 A1 * 10/2010 Maeda ...................... H01F 1/24 427/127
2017/0162307 A1 6/2017 Ishida
(Continued)

FOREIGN PATENT DOCUMENTS

JP 2000021618 A * 1/2000 ............... H01F 1/28
JP 2003303711 A * 10/2003 ............... H01F 1/24
(Continued)

OTHER PUBLICATIONS

Wendel J., et al.; "Oxide Reduction and Oxygen Removal in Water-Atomized Iron Powder: A Kinetic Study"; 2020, J. of Thermal Analysis and Calorimetry. (Year: 2020).*
(Continued)

*Primary Examiner* — Brian D Walck
*Assistant Examiner* — Austin Pollock
(74) *Attorney, Agent, or Firm* — XSENSUS LLP

(57) ABSTRACT

A dust core including soft magnetic metal particles and a grain boundary phase, wherein the grain boundary phase includes Si and Ti.

20 Claims, 1 Drawing Sheet

(56) References Cited

U.S. PATENT DOCUMENTS

| | | | | |
|---|---|---|---|---|
| 2019/0333678 | A1* | 10/2019 | Kubota | H01F 3/08 |
| 2020/0258664 | A1 | 8/2020 | Ishida | |
| 2021/0054218 | A1 | 2/2021 | Ishida | |

FOREIGN PATENT DOCUMENTS

| | | | | | |
|---|---|---|---|---|---|
| JP | 2014042006 | A | * | 3/2014 | |
| JP | 2016201484 | A | * | 12/2016 | |
| JP | 2018-011043 | A | | 1/2018 | |
| JP | 2019004169 | A | * | 1/2019 | |
| JP | 2019073748 | A | * | 5/2019 | |
| JP | 2019201191 | A | * | 11/2019 | |
| JP | 2020031140 | A | * | 2/2020 | |
| KR | 20170009928 | A | | 1/2017 | |
| WO | 2015/033825 | A1 | | 3/2015 | |
| WO | WO-2017023627 | A1 | * | 2/2017 | G06F 16/29 |
| WO | WO-2023157437 | A1 | * | 8/2023 | |

OTHER PUBLICATIONS

Moyer K.H.; revised by Kalathur S., et al; "Magnetic Materials and Properties for Powder Metallurgy Applications"; ASM Handbook, vol. 7, Powder Metallurgy, 2015 (Year: 2015).*

* cited by examiner

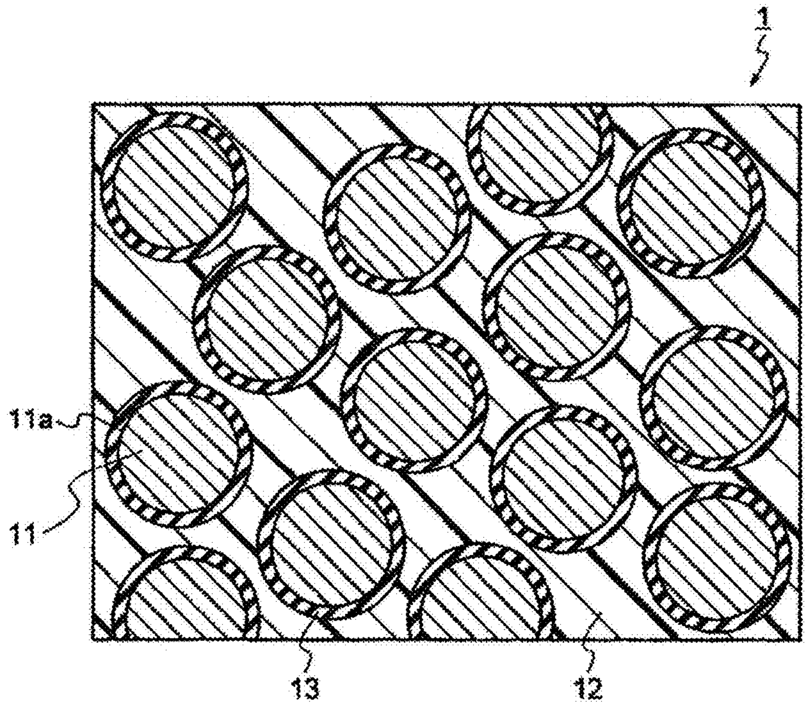
1
11a
11
13
12

DUST CORE AND MAGNETIC COMPONENT

This application claims priority to Japanese patent application No. 2022-059097 filed on Mar. 31, 2022, and Japanese patent application No. 2023-036001 filed on Mar. 8, 2023, each of which is incorporated herein by reference in its entirety.

BACKGROUND

The present disclosure relates to a dust core and a magnetic component.

Patent Document 1 discloses insulator-coated flat powder having an aspect ratio within a controlled range, and also discloses that the insulation coating of the insulator-coated flat powder is made of a polymer obtained by a raw material containing titanium alkoxides.

Patent Document 2 discloses a technology relating to a magnetic material including soft magnetic metal particles which are coated with oxide films made of a plurality of oxides.

[Patent Document 1] WO 2015/033825

[Patent Document 2] JP Patent Application Laid Open No. 2018-11043

SUMMARY

A dust core according to one aspect of the present disclosure includes soft magnetic metal particles and a grain boundary phase, wherein the grain boundary phase includes Si and Ti.

A magnetic component according to one aspect of the present disclosure includes the above-mentioned dust core.

BRIEF DESCRIPTION OF THE DRAWING

FIGURE illustrates a schematic cross-sectional view of a dust core according to one aspect of the subject technology.

DETAILED DESCRIPTION

Hereinafter, an embodiment of the present disclosure is described with reference to the drawing. The following described embodiment of the present disclosure is one example of the present disclosure. Each configurational element according to the embodiment of the present disclosure, such as numerical ranges, shapes, materials, production steps, and so on may be modified or changed within a range which does not cause technical problems.

Also, the shape shown in the drawing of the present disclosure does not necessarily accurately represent an actual shape, since the shape and so on may be modified for explanation.

As shown in FIGURE, a dust core 1 according to one embodiment of the present disclosure includes a metal magnetic particle (core particle) 11 and a grain boundary phase 12. In some embodiments, an insulation layer 13 is formed on a surface 11*a* of the core particle 11.

A soft magnetic metal particle may have the core particle 11, and the insulation layer 13 formed on the surface 11*a* of the core particle 11. In this case, the insulation layer 13 is covering the core particle 11.

As a component of the core particle 11, it is not particularly limited as long as a material exhibiting magnetic property is included, and Fe may be included in the core particle 11. When the core particle 11 includes Fe as a main component, saturation magnetization tends to increase easily. When the core particle 11 includes a combination of Fe and Ni as a main component, initial permeability μi tends to increase easily. When the core particle 11 includes a combination of Fe and Co as a main component, initial permeability μi tends to increase easily.

By referring "includes as a main component" means that an amount ratio of each element included in the main component is 1 wt % or more, a total amount ratio of elements included as the main component is 40 wt % or more, and an amount ratio of each element other than the elements as the main component is lower than the element showing the lowest amount ratio among the elements included as the main component.

When the core particle 11 includes Fe as the main component, an amount ratio of Fe is 40 wt % or more, and an amount ratio of each element other than Fe is lower than the amount ratio of Fe. Components other than the main component in the core particle 11 are not particularly limited. As such components other than the main component (Fe), for example, Ni, Co, Si, Zr, and V may be mentioned.

When the core particle 11 includes a combination of Fe and Si as the main component, an amount ratio of Fe is 1 wt % or more, an amount ratio of Si is 1 wt % or more, a total amount ratio of Fe and Si is 40 wt % or more, and an amount ratio of each element other than Fe and Si is lower than either one of Fe or Si which is exhibiting a lower amount ratio. Components other than the main component in the core particle 11 are not particularly limited. As for such components other than the main component (Fe and Si), for example, Ni, Co, Zr, and V may be mentioned.

When the core particle 11 includes a Fe or a combination of Fe and Si as the main component, a ratio of Fe and Si in the core particle 11 is not particularly limited. A weight ratio may be Si/Fe=0/100 to 20/80. When the weight ratio is within a range of Si/Fe=0/100 to 10/90, saturation magnetization tends to increase easily.

When the core particle 11 includes a combination of Fe and Ni as the main component, an amount ratio of Fe is 1 wt % or more, an amount ratio of Ni is 1 wt % or more, a total amount ratio of Fe and Ni is 40 wt % or more, and an amount ratio of each element other than Fe and Ni is lower than either one of Fe or Ni exhibiting a lower amount ratio. Components other than the main component are not particularly limited. As for the components other than the main component (Fe and Ni), for example, Co, Si, Zr, and V may be mentioned.

When the core particle 11 includes a Fe or a combination of Fe and Ni as the main component, a ratio of Fe and Ni in the core particle 11 is not particularly limited. A weight ratio may be Ni/Fe=0/100 to 75/25.

When the core particle 11 includes a combination of Fe and Co as the main component, an amount ratio of Fe is 1 wt % or more, an amount ratio of Co is 1 wt % or more, a total amount ratio of Fe and Co is 40 wt % or more, and an amount ratio of each element other than Fe and Co is lower than either one of Fe or Co which exhibits a lower amount ratio. A ratio of Fe and Co in the core particle 11 is not particularly limited. A weight ratio may be Co/Fe=0/100 to 50/50. Components other than the main component are not particularly limited. As for the components other than the main component (Fe and Co), for example, Ni, Si, Zr, and V may be mentioned.

When the core particle 11 includes a Fe or a combination of Fe and Co as the main component, a ratio of Fe and Co in the core particle 11 is not particularly limited. A weight ratio may be Co/Fe=0/100 to 50/50.

The dust core 1 according to the present embodiment includes soft magnetic metal particles and the grain boundary phase 12 which exist between the soft magnetic metal particles. The grain boundary phase 12 includes Si and Ti.

A method to include Si and Ti in the grain boundary phase 12 is not particularly limited. For example, Ti may be included in the resin which includes Si (such as a silicone resin), and then mixed with the soft magnetic metal particles, thereby the grain boundary phase 12 may be formed. As the silicone resin, for example, a methyl-based silicone resin may be mentioned.

When Ti is included in the grain boundary phase 12, initial permeability μi of the dust core 1 tends to increase easily compared to the case at the same density but without Ti.

In some embodiments, in addition to the resin including Si, the grain boundary phase 12 may also include components other than the resin including Si. For example, an epoxy resin, an imide resin, Si—O-based oxides, Ca—O-based oxides, Ba—O-based oxides, and/or Bi—O-based oxides may be mixed with the resin including Si. As the epoxy resin, for example, cresol novolac may be mentioned. As the imide resin, for example, bismaleimide may be mentioned.

By carrying out heat treatment which is described in below, the resin included in the grain boundary phase 12 may partially or completely change into Si—O-based oxides such as $SiO_2$ and the like.

An amount of the core particles 11 and an amount of compounds included in the grain boundary phase 12 are not particularly limited. In some embodiments, the amount of the core particles 11 in the dust core 1 as a whole is within a range of 90 wt % to 99.9 wt %. In some embodiments, the amount of compounds included in the grain boundary phase 12 in the dust core 1 as a whole is within a range of 0.1 wt % to 10 wt %.

An amount ratio of Ti in the grain boundary phase 12 is not particularly limited. In some embodiments, it is within a range of 100 ppm or more and 3000 ppm or less by mass with respect to the dust core 1.

When the amount ratio of Ti is within the above-mentioned range, initial permeability μi tends to improve even easier.

The insulation layer 13 does not necessarily have to cover the entire surface 11*a* of the core particle 11. In some embodiments, the insulation layer 13 covers 90% or more of the entire surface 11*a* of the core particle 11.

In some embodiments, the insulation layer 13 includes oxides of Si. A type of oxides of Si included in the insulation layer 13 is not particularly limited. For example, Si—O-based oxides (silicon oxides) may be included. Also, a type of Si—O-based oxides is not particularly limited. For example, other than the oxides of Si such as $SiO_2$ and the like, a composite oxide including Si and other elements may be included. As such other elements, for example, Ba, Ca, Mg, Al, Ti, Nb, Ta, Zr, Ni, Mn, and Zn, which are elements that the oxides thereof have insulation property, may be mentioned. Regarding the amount of other elements, for example, an amount ratio of each element is 1 mol % or less with respect the amount of Si.

The insulation layer 13 is formed directly or indirectly on the surface of the core particle 11. That is, the insulation layer 13 may be in contact with the surface 11*a* of the core particle 11, or a layer other than the insulation layer 13 may exist between the insulation layer 13 and the surface 11*a* of the core particle 11.

A material of the layer other than insulation layer 13 is not particularly limited. For example, the layer other than insulation layer 13 may be a layer which includes Si and O, and also elements included in the core particle 11 (such as Fe). Also, the layer other than insulation layer 13 may be a layer which includes phosphoric acid compound. When the layer other than insulation layer 13 exists, a thickness of the layer other than insulation layer 13 may be 20 nm or less.

In some embodiments, the insulation layer 13 includes Ti and oxides of Si. In such case, the layer other than the insulation layer 13 may not include Ti and oxides of Si.

In the insulation layer 13, it is not particularly limited as to how Ti is included. For example, in some embodiments, a simple substance of Ti may be scattered in the insulation layer 13. Also, in some embodiments, the insulation layer 13 includes a compound including Ti. A type of a compound including Ti is not particularly limited. As the compound including Ti, for example, an organometallic compound such as titanium alkoxide and titanate (a metal complex having Ti as central metal) may be mentioned. Also, the compound including Ti may be a simple oxide of Ti, or it may be a composite oxide including Ti and other elements.

An amount ratio of Ti in the insulation layer 13 is not particularly limited.

In some embodiments, in addition to Ti, the insulation layer 13 includes metal elements other than Ti. As the metal elements other than Ti, for example, Ba, Ca, Mg, Al, Zr, Ni, Mn, and Zn may be mentioned which are elements that the oxides thereof have an insulation property. Among these, Ca, Mg, Zr, Ni, Mn, and Zn are elements which may be introduced into the insulation layer relatively easily. The amount of the metal elements other than Ti is not particularly limited. Regarding the amounts of the other elements, for example, a total amount ratio of the elements other than Ti is 1 mol % or less with respect to the amount of Ti.

A thickness of the insulation layer 13 is not particularly limited. The thickness of the insulation layer 13 is, for example, within a range of 5 nm or more and 500 nm or less.

A method of observing a cross section of the dust core 1 is not particularly limited. For example, the dust core 1 may be observed under an appropriate magnification using SEM or TEM. Further, by carrying out EDS analysis, a composition of the dust core 1 at each point, particularly the amount of Ti and the amount of Si may be measured. Further, Ti/(Si+Ti) in the insulation layer 13 may be measured. The amount of Ti in the core particle 11 may be measured using the same method.

When measuring the amount ratio of Ti in the grain boundary phase 12, for example, first, the amount of Ti in the core particles 11 and the amount of Ti in the insulation layers 13 are measured as described in above. Then, the amount of Ti in the dust core 1 as a whole is quantified using ICP. Then, the amount of Ti in all of the core particles 11 and the amount of Ti in all of the insulation layers 13 are subtracted from the amount of Ti in the dust core 1 as a whole, thereby the amount ratio of Ti in the grain boundary phase 12 may be measured.

A method of producing the dust core 1 is described in below, however, the method of producing the dust core 1 is not limited to the below method.

First, the core particles 11 are produced. A method of producing the core particles 11 is not particularly limited, and for example, a gas atomization method and a water atomization method may be mentioned. A particle size and a circularity of the core particle 11 is not particularly limited. When the median (D50) of particle sizes is within a range of 1 μm to 100 μm, initial permeability μi tends to increase easily. The circularity of the core particle is not particularly limited, and for example, it may be within a range of 0.5 or lager and 1 or smaller, 0.7 or larger and 1 or smaller, or 0.8 or larger and 1 or smaller.

In some embodiments, a layer including phosphoric acid compound may be formed on the surface 11*a* of the core particle 11. A method of forming the layer including phosphoric acid compound is not particularly limited.

Next, when the insulation layer 13 including Ti and oxides of Si is formed, coating is carried out to form the insulation layer 13 which includes Ti and oxides of Si to the surface 11*a* of the core particle 11. When the layer including phosphoric compound is formed on the surface 11*a* of the core particle 11, a coating treatment is carried out to form the insulation layer on the surface of the layer including phosphoric acid compound. A method of coating is not particularly limited, and for example, a coating method of which a coating solution including alkoxysilane and Ti is applied to the core particle 11 may be mentioned. A method of applying the coating solution to the core particle 11 is not particularly limited, and for example, a spray diffusion method may be mentioned. There is no particular limitation as for the state of Ti included in the coating solution. For example, Ti may be included as titanium alkoxide, or Ti may be included as titanate. When Ti is included as titanate or titanium alkoxide, and also when the below described heat treatment is carried out to a green compact, titanate or titanium alkoxide decomposes due to the heat treatment. Hereinbelow, the case which includes titanium alkoxide in the coating solution is described.

A concentration of alkoxysilane, a concentration of titanium alkoxide, and a type of solvent in the coating solution are not particularly limited.

As alkoxysilane, monoalkoxysilane, dialkoxysilane, trialkoxysilane, and tetraalkoxysilane may be mentioned as examples. As monoalkoxysilane, trimethylmethoxysilane, trimethylethoxysilane, and trimethyl(phenoxy)silane may be mentioned as examples. As dialkoxysilane, dimethyldimethoxysilane, dimethyldiethoxysilane, diisopropyldimethoxysilane, diisobutyldimethoxysilane, t-butylmethyldimethoxysilane, and t-butylmethyldiethoxysilane may be mentioned as examples. As trialkoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, and phenyltrimethoxysilane may be mentioned as examples. As tetraalkoxysilane, tetramethoxysilane, tetraethoxysilane, tetrapropoxysilane, and tetraisopropoxysilane may be mentioned as examples. As alkoxysilane, one type of alkoxysilane may be used, or two or more types of alkoxysilanes may be used together.

As titanium alkoxide, titanium tetramethoxide, titanium tetraethoxide, titanium tetra-n-propoxide, titanium tetraisopropoxide, and titanium tetra-n-butoxide may be mentioned as examples. As titanium alkoxide, one type of titanium alkoxide may be used, or two or more types of titanium alkoxides may be used together. From the point of easiness to obtain, titanium alkoxide may be titanium tetraethoxide or titanium tetra-n-butoxide.

The concentration of alkoxysilane and the concentration of titanium alkoxide may be determined based on the target value of Ti/(Si+Ti), the target thickness of the insulation layer 13, and so on. Also, a type of solvent for the coating solution is not particularly limited. Water, ethanol, isopropyl alcohol, and so on may be mentioned as examples of the solvent.

During spray diffusion, a ratio of alkoxysilane with respect to the entire amount of the core particles 11 may be within a range of 0.1 wt % to 5 wt %. The more alkoxysilane is included, the thicker the insulation layer 13 tends to be.

A condition of spray diffusion is not particularly limited, and by carrying out spray diffusion while heat treating at a temperature range between 50° C. to 90° C., a sol-gel reaction which forms the insulation layer 13 tends to be facilitated.

After removing the solvent by drying the core particles 11 to which the coating solution is spray diffused, the core particles 11 are heated at a temperature within a range of 200° C. to 400° C. for 1 hour to 10 hours; thereby a sol-gel reaction proceeds and the insulation layers 13 including Ti and oxides of Si are formed. At this time, the higher the heating temperature is and the longer the heating time is, the higher the density of insulation layer 13 tends to be. Also, before the core particles 11 are heated, the core particles 11 may be sized by passing through a mesh sieve.

Next, when a resin is included in the grain boundary phase 12 of the green compact which is before the heat treatment described in below, a resin solution is prepared. In the resin solution, a curing agent may be added in addition to the silicone resin, the epoxy resin and/or the imide resin which are mentioned in above. A type of curing agent is not particularly limited, and for example, epichlorohydrin may be mentioned. Also, a solvent for the resin solution is not particularly limited, and it may be a solvent having volatility. For example, acetone and ethanol may be mentioned. A total concentration of the resin and curing agent is, for example, within a range of 10 to 80 wt % in 100 wt % of the resin solution as a whole.

Further, by adding Ti to the resin solution at this point, the dust core having Si and Ti in the grain boundary phase may be obtained. There is no particular limitation as for the state of Ti included in the resin solution. For example, Ti may be included as titanium alkoxide, or Ti may be included as titanate. As titanium alkoxide, titanium tetramethoxide, titanium tetraethoxide, titanium tetra-n-propoxide, titanium tetraisopropoxide, and titanium tetra-n-butoxide may be mentioned as examples. As titanium alkoxide, one type of titanium alkoxide may be used, or two or more types of titanium alkoxides may be used together. From the point of easiness to obtain, titanium alkoxide may be titanium tetraethoxide or titanium tetra-n-butoxide. Further, by regulating the added amount of Ti, the amount ratio of Ti in the grain boundary phase 12 may be regulated.

Next, the core particles 11 formed with the insulation layers 13 and the resin are mixed; that is, the soft magnetic metal particles and the resin solution are mixed. Then, the solvent of the resin solution is evaporated, and granules are obtained. The obtained granules may be directly placed in a mold, or it may be placed in the mold after sieving. A method of sieving is not particularly limited, and for example, a mesh having an opening of 45 to 500 μm may be used.

Next, the obtained granules are placed in the mold of a predetermined shape, and then compressed to obtain the green compact. Pressure for compression (molding pressure) is not particularly limited, and for example, it may be within a range of 500 to 1500 MPa. The higher the molding pressure is, the higher the initial permeability μi of the dust core 1 obtained at the end is.

When the case of including Ti in the grain boundary phase 12 is compared to the case of not including Ti in the grain boundary phase 12, even if the same molding pressure is applied, the initial permeability μi of the dust core 1 tends to be higher when the grain boundary phase 12 includes Ti.

The produced green compact may be used as a dust core. Also, the produced green compact may be heat treated to produce a sintered body, and then the sintered body may be used as a dust core. A condition of the heat treatment is not particularly limited. When a silicone resin is used as the resin, the heat treatment may be carried out under the condition that the silicone resin sinters. For example, the heat treatment may be carried out at a temperature within a range of 400° C. to 1000° C. for 0.1 hour to 10 hours. Also, atmosphere during the heat treatment is not particularly limited, and the heat treatment may be carried out in the air, or in nitrogen atmosphere.

When the green compact includes titanate or titanium alkoxide, the above-mentioned heat treatment may partially or completely decompose titanate or titanium alkoxide. Particularly, regarding titanate, by heat treating at a temperature within a range of 700° C. or higher and 1000° C. or lower, titanate may be completely decomposed. That is, by heat treating at a temperature within a range of 700° C. or higher and 1000° C. or lower, it is possible to make the sintered body which does not include titanate.

Hereinabove, the dust core and the method of production thereof according to the present embodiment have been described, however, the dust core and the method of production thereof according to the present disclosure is not limited to the above-described embodiment.

Also, the use of the dust core of the present disclosure is not particularly limited. For example, magnetic components such as an inductor, a reactor, a choke coil, a transformer, and so on may be mentioned. The magnetic component of the present disclosure includes the above-mentioned dust core.

EXAMPLES

In below, the present disclosure is described based on further detailed examples, however, the present disclosure is not limited to these examples.

Experiment Example 1

As metal magnetic particles (core particles), Fe—Si-based alloy particles (alloy particles including a combination of Fe and Si as a main component) were prepared by using a gas atomization method, in which Si and Fe satisfied Si/Fe=4.5/95.5 by weight ratio and a total amount of Fe and Si satisfied 99 wt % or more. A median (D50) of particle sizes of the Fe—Si-based alloy particles was 30 μm.

Next, a coating solution for forming an insulation layer to a surface of the metal magnetic particle was prepared. The coating solution was made by mixing 15 parts by weight of ethanol, trimethoxysilane, and 2.0 parts by weight of pure water to 100 parts by weight of a total amount of the metal magnetic particles. The amount of trimethoxysilane was adjusted so that a thickness of the insulation layer obtained at the end was 50 nm.

The metal magnetic particles and the coating solution were mixed, and then heat treated while performing spray diffusion. A heat treatment temperature was 80° C. and a heat treatment time was 1 hour. Further, by drying after the heat treatment, the metal magnetic particles having insulation layers on the surfaces were obtained.

The obtained metal magnetic particles were passed through a sieve of 140 mesh, and then a heat treatment was carried out. A heat treatment temperature was 300° C. and a heat treatment time was 5 hours.

Next, a silicone resin and acetone were mixed to produce a resin solution. As the silicone resin, Shin-Etsu Silicone KR-242A (made by Shin-Etsu Chemical Co., Ltd) was used. The silicone resin and acetone were mixed so that a weight ratio of the silicone resin to acetone was 34:66.

Further, titanium tetra-n-butoxide was added to the obtained resin solution. An added amount of titanium tetra-n-butoxide was adjusted so that an amount ratio of Ti by mass in the grain boundary phase with respect to the dust core was as shown in Table 1.

Six parts by weight of the above-mentioned resin solution was added and mixed with a total amount of 100 parts by weight of the above-mentioned metal magnetic particles. Next, acetone was evaporated by drying, thereby granules were obtained. Then, the granules were sized by passing through a sieve of 42 mesh. The obtained granules were dried on a hot plate of 50° C. for 0.5 hours, thereby a granulated powder was obtained.

To 100 parts by weight of the granulated powder, 0.1 parts by weight of zinc stearate was added, and then metal molding was carried out to obtain a toroidal core. A filled amount of the granulated powder was 5 g. A molding pressure was appropriately adjusted so that a toroidal dust core obtained at the end had density of about 6.4 g/cm$^3$. A shape of the mold was a toroidal shape having an outer diameter of φ 17.5 mm, an inner diameter of φ 10.0 mm, and a thickness of 4.8 mm.

The obtained toroidal core was heat treated at 700° C. for 1 hour, thereby the toroidal dust core was obtained. The metal magnetic particles were adjusted to be about 98 wt % with respect to 100 wt % of the dust core as a whole which was obtained at the end.

By observing the toroidal core using TEM-EDS, the insulation layers covering the metal magnetic particles were verified. It was also confirmed that Ti was substantially only included in the grain boundary phase, and Ti was substantially not included in the insulation layers. An amount of Ti in the grain boundary phase was quantified using ICP, and it was divided by a total weight of the toroidal dust core, thereby an amount ratio of Ti in the grain boundary phase was calculated. Results are shown in Table 1.

The thickness of the insulation layer was measured by TEM observation. A measuring point was set on the surface of the soft magnetic metal particle. Then, a perpendicular line was drawn from the measuring point to the direction of the insulation layer, and the length of the perpendicular line within the insulation layer was defined as the length of the insulation layer at the measuring point. Such measuring point was set to 10 particles, and the thickness of the insulation layer from each measuring point was measured. Then, the average of the measured insulation layer thicknesses was defined as a thickness of the insulation layer of the metal magnetic particle. It was confirmed that the thickness of the insulation layer was about 50 nm for all of Examples and Comparative examples.

An initial permeability μi of the toroidal dust core was measured using a LCR meter (LCR428A made by HP) by winding 50 turns of a wire around the toroidal dust core. Regarding the initial permeability μi, 45.0 or more was considered good, and 50.0 or more was considered excellent.

A density of the toroidal dust core was calculated using the size and weight of the obtained dust core. In all of Examples and Comparative examples, it was about 6.4 g/cm$^3$.

TABLE 1

| Sample No. | Grain boundary phase Ti containing ratio (Mass ppm) | Initial permeability μi |
|---|---|---|
| Comp. Example 1 | 0 | 39.5 |
| Example 1 | 13.2 | 45.3 |
| Example 2 | 35.4 | 47.7 |
| Example 3 | 48.7 | 47.9 |
| Example 4 | 89.4 | 48.1 |
| Example 5 | 98.9 | 48.8 |
| Example 6 | 103 | 51.0 |
| Example 7 | 125 | 52.3 |
| Example 8 | 153 | 53.6 |
| Example 9 | 178 | 53.3 |
| Example 10 | 260 | 55.6 |
| Example 11 | 356 | 56.6 |
| Example 12 | 471 | 55.7 |
| Example 13 | 689 | 54.5 |
| Example 14 | 1243 | 53.4 |
| Example 15 | 1564 | 51.4 |
| Example 16 | 2487 | 51.1 |
| Example 17 | 2998 | 50.8 |
| Example 18 | 3067 | 47.3 |
| Example 19 | 5043 | 46.9 |
| Example 20 | 7900 | 46.4 |
| Example 21 | 9402 | 45.7 |
| Example 22 | 10006 | 45.5 |

According to Table 1, when the densities of the toroidal dust cores were about the same, Examples having Si and Ti in the grain boundary phase exhibited higher initial permeabilities μi compared to Comparative example 1 which did not have Ti in the grain boundary phase. Examples having the amount ratio of Ti in the grain boundary phase within a range of 100 ppm or more and 3000 ppm or less by mass with respect to the dust core exhibited even higher initial permeability compared to other Examples.

Experiment Example 2

In Experiment example 2, the toroidal dust core was produced in the same manner as Experiment example 1 except that titanium tetra-n-butoxide was added to the coating solution. A ratio of trimethoxysilane and titanium tetra-n-butoxide was adjusted so that Ti/(Si+Ti) in the coating layer obtained at the end satisfied the values shown in Table 2.

In Experiment example 2, it was confirmed by TEM-EDS observation that the insulation layer covering the metal magnetic particle existed. It was also confirmed that Ti was substantially only included in the insulation layer and the grain boundary phase. Further, Ti/(Si+Ti) in the insulation layer was quantified using EDS. Ten measuring points were set to the insulation layer, and the average of Ti/(Si+Ti) calculated from the measuring points is shown in Table 2.

A method of calculating the amount ratio of Ti in the grain boundary phase of Experiment example 2 is described in following. First, the amount of Ti in all of the insulation layers and the amount of Ti in all of the core particles were quantified using EDS, and then the amount of Ti in the toroidal dust core as a whole was quantified using ICP. Then, the amount of Ti in all of the insulation layers and the amount of Ti in all of the core particles were subtracted from the amount of Ti in the toroidal dust core as a whole, thereby the amount of Ti in the grain boundary phase was calculated. Then, it was divided by the total weight of the toroidal dust core, thereby the amount ratio of Ti in the grain boundary phase was calculated. Results are shown in Table 2.

TABLE 2

| Sample No | Grain boundary phase Ti containing ratio (Mass ppm) | Ti/(Si + Ti) (mol %) | Initial permeability μi |
|---|---|---|---|
| Example 23 | 105 | 1.3 | 50.8 |
| Example 24 | 264 | 5.2 | 55.3 |
| Example 25 | 2981 | 30 | 50.1 |

According to Table 2, it was confirmed that good initial permeability μi was obtained even when Ti was included in the insulation layer in addition to the grain boundary phase.

REFERENCE SIGNS LIST

1 . . . Dust core
11 . . . Metal magnetic particle (core particle)
**11*a*** . . . Surface of metal magnetic particle
12 . . . Grain boundary phase
13 . . . Insulation layer

What is claimed is:

1. A dust core comprising soft magnetic metal particles and a grain boundary phase, wherein
- the grain boundary phase includes Si and Ti,
- at least one soft magnetic metal particle of the soft magnetic metal particles comprises a core particle and an insulation layer formed on a surface of the core particle, a layer other than the insulation layer exists between the insulation layer and the surface of the core particle, a content of Ti in the grain boundary phase is higher than that in the insulation layer,
- the layer other than the insulation layer includes a phosphoric acid compound,
- an amount ratio of Ti in the grain boundary phase is within a range of 100 ppm or more and 3000 ppm or less by mass with respect to a total weight of the dust core, and
- an initial permeability μi of the dust core is 50.0 or more.

2. The dust core according to claim 1, wherein at least one soft magnetic metal particle of the soft magnetic metal particles includes Fe.

3. The dust core according to claim 1, wherein the insulation layer includes an oxide of Si.

4. The dust core according to claim 1, wherein an amount of the soft magnetic metal particles in the dust core is within a range of 90 wt % to 99.9 wt %.

5. The dust core according to claim 1, wherein a thickness of the insulation layer is in a range of 5 nm or more and 500 nm or less.

6. The dust core according to claim 1, wherein the layer other than the insulation layer has a thickness of 20 nm or less.

7. The dust core according to claim 1, wherein the grain boundary phase further includes a resin including Si, and Ti is mixed with the resin including Si.

8. The dust core according to claim 7, wherein the resin including Si is a methyl-based silicone resin.

9. The dust core according to claim 7, wherein the grain boundary phase further includes an epoxy resin, an imide resin, Si—O-based oxides, Ca—O-based oxides, Ba—O-based oxides, and/or Bi—O-based oxides.

10. The dust core according to claim 1, wherein the insulation layer includes Ti and an oxide of Si.

11. The dust core according to claim 10, wherein the insulation layer further includes at least one element selected from the group consisting of Ba, Ca, Mg, Al, Zr, Ni, Mn, and Zn, and a total amount ratio of the at least one element is 1 mol % or less with respect to a total amount of Ti in the insulation layer.

12. The dust core according to claim 10, wherein the oxide of Si is $SiO_2$ or a composite oxide which includes Si.

13. The dust core according to claim 1, wherein the core particle includes Fe.

14. The dust core according to claim 13, wherein the core particle further includes Si, Ni, or Co.

15. A magnetic component including the dust core according to claim 1.

16. A dust core comprising soft magnetic metal particles and a grain boundary phase, wherein the grain boundary phase includes Si and Ti, at least one soft magnetic metal particle of the soft magnetic metal particles comprises a core particle and an insulation layer formed on a surface of the core particle, the insulation layer includes Ti and an oxide of Si, the insulation layer includes a simple substance of Ti and/or an organometallic compound including Ti, a content of Ti in the grain boundary phase is higher than that in the insulation layer, an amount ratio of Ti in the grain boundary phase is within a range of 100 ppm or more and 3000 ppm or less by mass with respect to a total weight of the dust core, and an initial permeability μi of the dust core is 50.0 or more.

17. The dust core according to claim 16, wherein at least one soft magnetic metal particle of the soft magnetic metal particles includes Fe.

18. A magnetic component including the dust core according to claim 16.

19. A dust core comprising soft magnetic metal particles and a grain boundary phase, wherein the grain boundary phase includes Si and Ti, at least one soft magnetic metal particle of the soft magnetic metal particles comprises a core particle and an insulation layer formed on a surface of the core particle, the insulation layer includes Ti and an oxide of Si, the insulation layer includes a simple substance of Ti and/or an organometallic compound including Ti, the average value of Ti/(Si+Ti) in the insulation layer of all soft magnetic metal particles contained in the soft magnetic metal particles in the dust core is 1.3 mol % or higher, a content of Ti in the grain boundary phase is higher than that in the insulation layer, and an amount ratio of Ti in the grain boundary phase is within a range of 100 ppm or more and 3000 ppm or less by mass with respect to a total weight of the dust core.

20. A magnetic component including the dust core according to claim 19.

* * * * *